US012538211B2

(12) United States Patent
Huang et al.

(10) Patent No.: US 12,538,211 B2
(45) Date of Patent: Jan. 27, 2026

(54) BASIC SERVICE SET CHANNEL OPERATION

(71) Applicant: Intel Corporation, Santa Clara, CA (US)

(72) Inventors: Po-Kai Huang, San Jose, CA (US); Danny Alexander, Neve Efraim Monoson (IL); Daniel F. Bravo, Hillsboro, OR (US); Laurent Cariou, Milizac (FR); Xiaogang Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 17/921,746

(22) PCT Filed: Jul. 22, 2021

(86) PCT No.: PCT/US2021/042770
§ 371 (c)(1),
(2) Date: Oct. 27, 2022

(87) PCT Pub. No.: WO2022/020586
PCT Pub. Date: Jan. 27, 2022

(65) Prior Publication Data
US 2023/0164676 A1 May 25, 2023

Related U.S. Application Data

(60) Provisional application No. 63/055,154, filed on Jul. 22, 2020.

(51) Int. Cl.
*H04W 48/16* (2009.01)
*H04W 72/0453* (2023.01)
*H04W 84/12* (2009.01)

(52) U.S. Cl.
CPC ....... *H04W 48/16* (2013.01); *H04W 72/0453* (2013.01); *H04W 84/12* (2013.01)

(58) Field of Classification Search
CPC . H04W 48/16; H04W 72/0453; H04W 48/08; H04W 28/24; H04W 74/002
See application file for complete search history.

(56) References Cited

U.S. PATENT DOCUMENTS

2019/0045461 A1* 2/2019 Fang .................. H04W 52/245
2019/0327740 A1 10/2019 Verma et al.
(Continued)

FOREIGN PATENT DOCUMENTS

| CN | 115885544 | 3/2023 |
|---|---|---|
| WO | WO-2020022712 A1 | 1/2020 |
| WO | WO-2022020586 A1 | 1/2022 |

OTHER PUBLICATIONS

"Chinese Application Serial No. 202180044186.9, Voluntary Amendment filed Jan. 5, 2024", w current English claims, 16 pgs.
(Continued)

*Primary Examiner* — Anez C Ebrahim
(74) *Attorney, Agent, or Firm* — Schwegman Lundberg & Woessner, P.A.

(57) ABSTRACT

Methods, apparatuses, and computer readable media for basic service set (BSS) channel operation are disclosed. Apparatuses of a station (STA) are disclosed, where the apparatuses comprise processing circuitry configured to decode a first frame, the first frame comprising an extremely-high throughput (EHT) operation information field, the EHT operation information field comprising a channel width subfield and a channel center frequency segment, the channel width subfield indicating a basic service set (BSS) contiguous channel width, and the channel center frequency segment indicating a channel center frequency for the BSS channel width on which the BSS
(Continued)

operates in 6 GHz. The processing circuitry further configured to encode for transmission a second frame for transmission on a primary channel within the BSS channel width.

20 Claims, 14 Drawing Sheets

(56) References Cited

U.S. PATENT DOCUMENTS

2020/0015219 A1  1/2020  Asterjadhi et al.
2020/0221545 A1*  7/2020  Stacey .................. H04W 84/12
2020/0403680 A1*  12/2020  Li ........................ H04B 7/0695

OTHER PUBLICATIONS

"European Application Serial No. 21847364.3, Extended European Search Report mailed May 28, 2024", 12 pgs.
Jason, Yuchen Guo, "EHT Operation Element for 320MHz", IEEE Draft; 11-20-0624-00-00be-Eht-Operation-Elementfor-320mhz, IEEE-Sa Mentor, Piscataway, NJ USA, vol. 802, [Online]. Retrieved from the Internet: https: mentor.ieee.org 802.11 dcn 20 11-20-0624-00-00beeht-operation-element-for-320mhz.pptx, (May 11, 2020), 1-11.
"Japanese Application Serial No. 2022-577602, Notification of Reasons for Refusal mailed Nov. 12, 2024", w English translation, 8 pgs.
"European Application Serial No. 21847364.3, Response filed Dec. 11, 2024 to Extended European Search Report mailed May 28, 2024", 29 pgs.
Guogang, Huang, "pdt-mac-eht-operation-element", IEEE 802.11-20 1359r2, IEEE mentor, (Sep. 14, 2020), 4 pages.
Insun, Jang, "Discussion on Multi-link Setup", (LG Electronics), IEEE 802.11-19 1509r0, IEEE mentor, (Sep. 15, 2019), 16 pages.
Po-Kai, Huang, "320 Mhz BSS Configuration Follow Up", IEEE 802.11-20 0668r0, IEEE mentor, (May 10, 2020), 16 pages.
Thomas, Derham, "Miscellaneous 6GHz Channelization CIDs", IEEE 802. 1I-20 0822r0, IEEE mentor, (May 26, 2020), 25 pages.
"International Application Serial No. PCT US2022 047117, International Preliminary Report on Patentability mailed May 2, 2024", 6 pgs.
"Korean Application Serial No. 10-2023-7044403, Voluntary Amendment Filed Jan. 24, 2025", w Korean Claims, 18 pgs.
"International Application Serial No. PCT US2021 042770, International Preliminary Report on Patentability mailed Feb. 2, 2023", 6 pgs.
"International Application Serial No. PCT/US2021/042770, International Search Report mailed Oct. 29, 2021", 3 pgs.
"International Application Serial No. PCT/US2021/042770, Written Opinion mailed Oct. 29, 2021", 4 pgs.
Insun, Jang, et al., "Indication of Multi-link Information", IEEE 802.11-20/0028r0, (Jan. 12, 2020).
Po-Kai, Huang, et al., "320 MHz BSS Configuration Follow Up", IEEE 802.11-20/0668r2, (Jul. 15, 2020).
Thomas, Derham, et al., "Miscellaneous 6 GHz channelization CIDs", IEEE 802.11-20/0822r5, (Jun. 25, 2020), 18-19.

* cited by examiner

BSS

BASIC SERVICE SET CHANNEL OPERATION

PRIORITY CLAIM

This application is a U.S. National Stage Filing under 35 U.S.C. 371 from International Application No. PCT/US2021/042770, filed Jul. 22, 2021 and published in English as WO 2022/020586 on Jan. 27, 2022, which claims the benefit of priority to .U.S. Provisional Patent Application Ser. No. 63/055,154, filed Jul. 22, 2020, each of which is incorporated herein by reference in its entirety.

TECHNICAL FIELD

Embodiments relate to devices operating in accordance with wireless local area networks (WLANs) and Wi-Fi networks including networks operating in accordance with different versions or generations of the IEEE 802.11 family of standards. Some embodiments relate to communicating channel configurations for extremely high throughput (EHT) operation in the 6 GHz band.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols, and wireless devices may need to operate with more than one frequency band.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
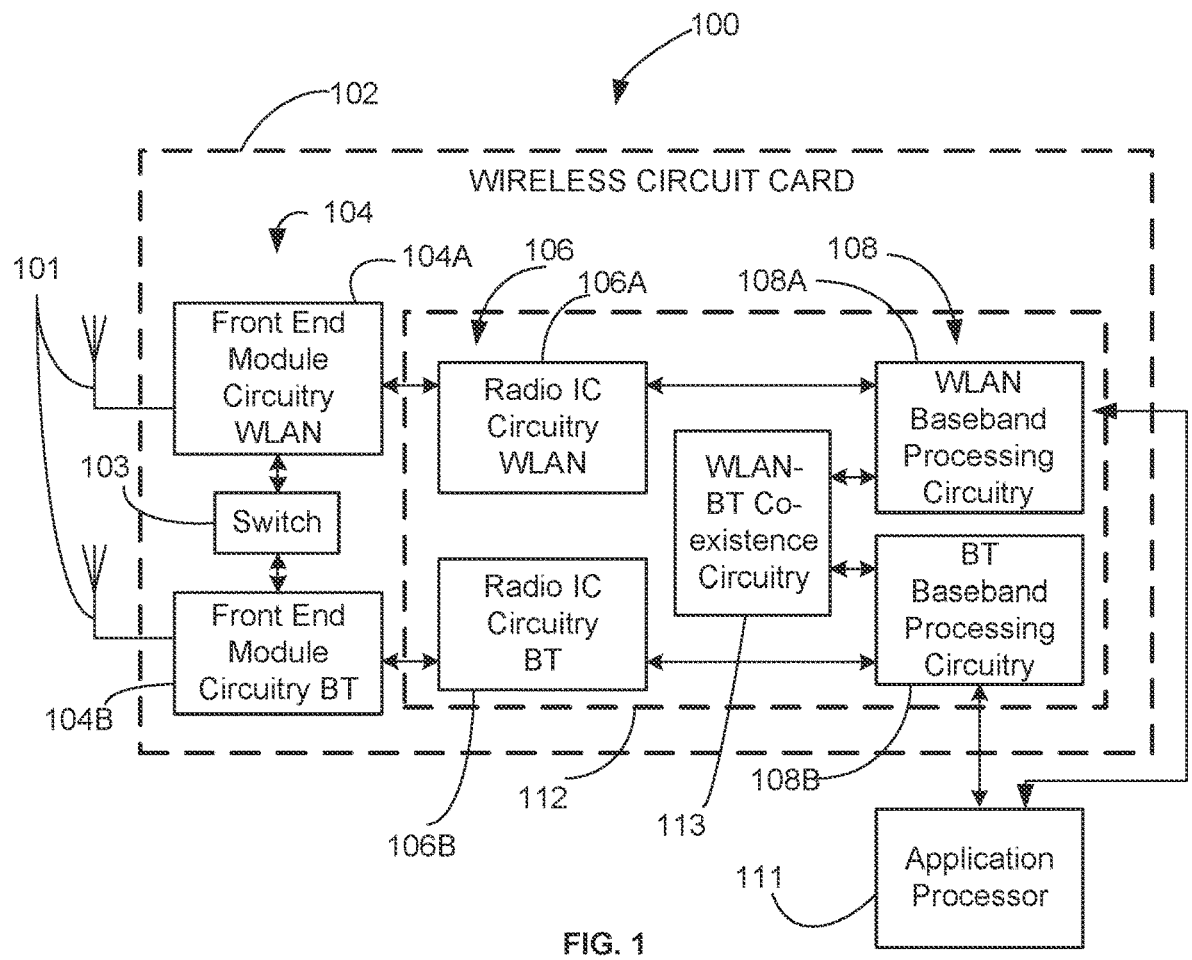
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
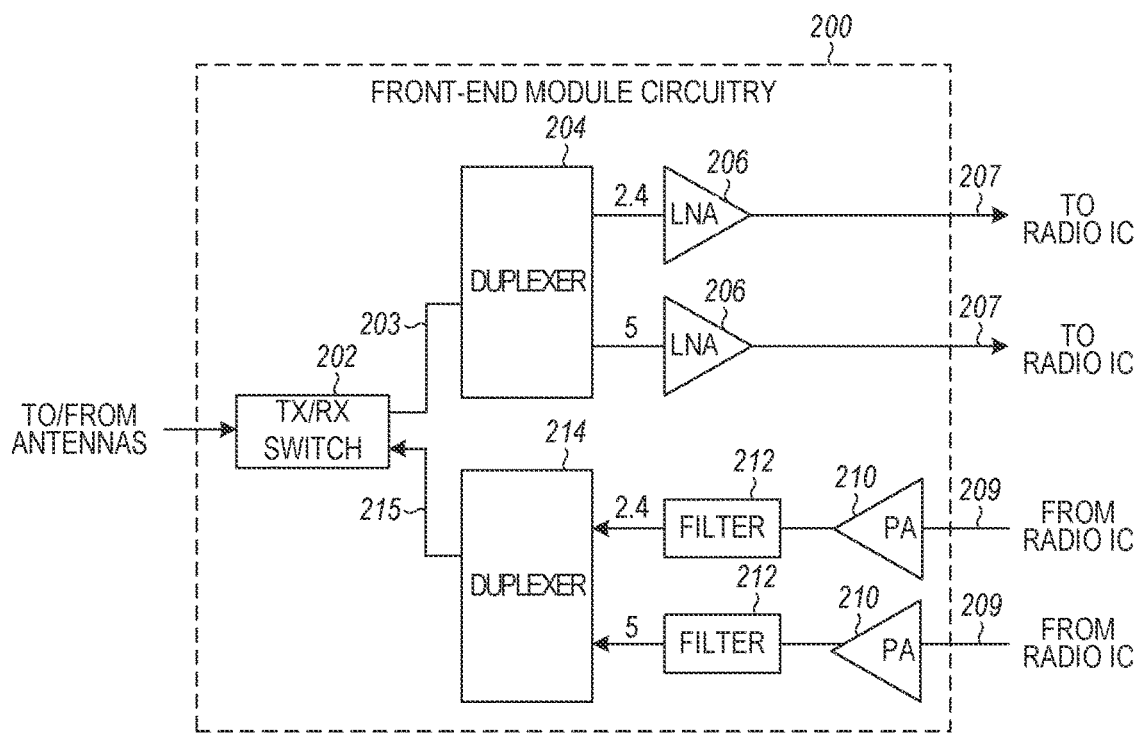
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
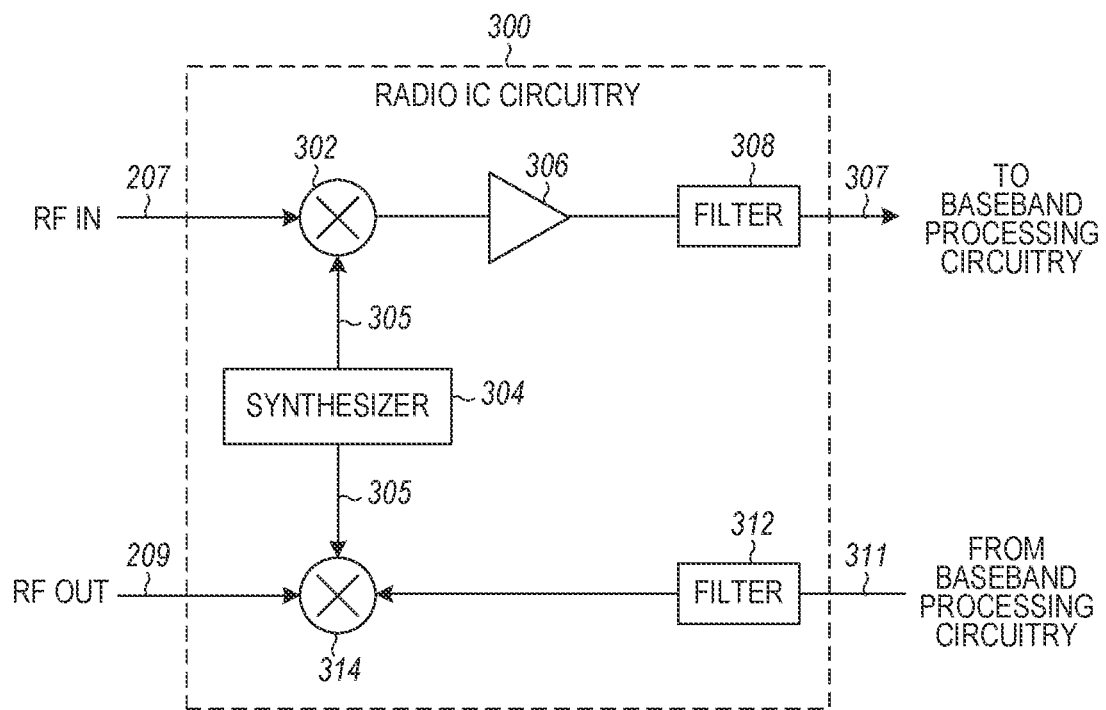
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
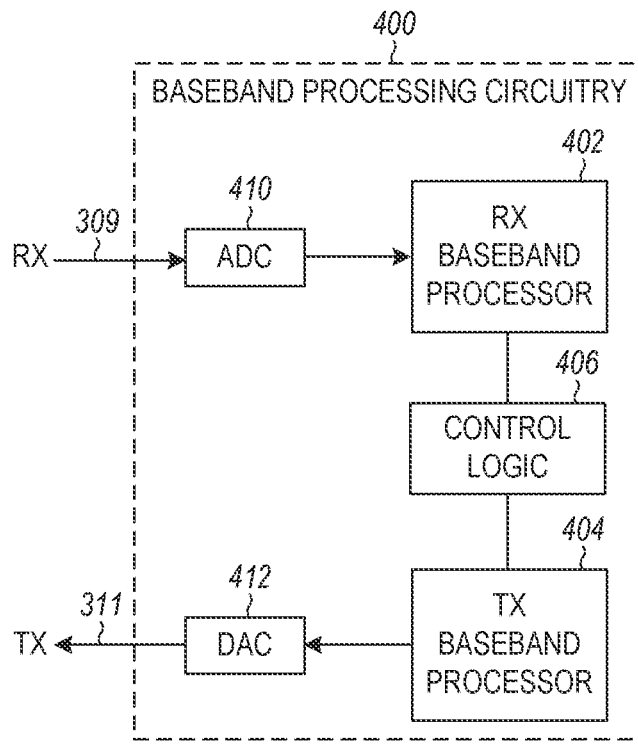
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
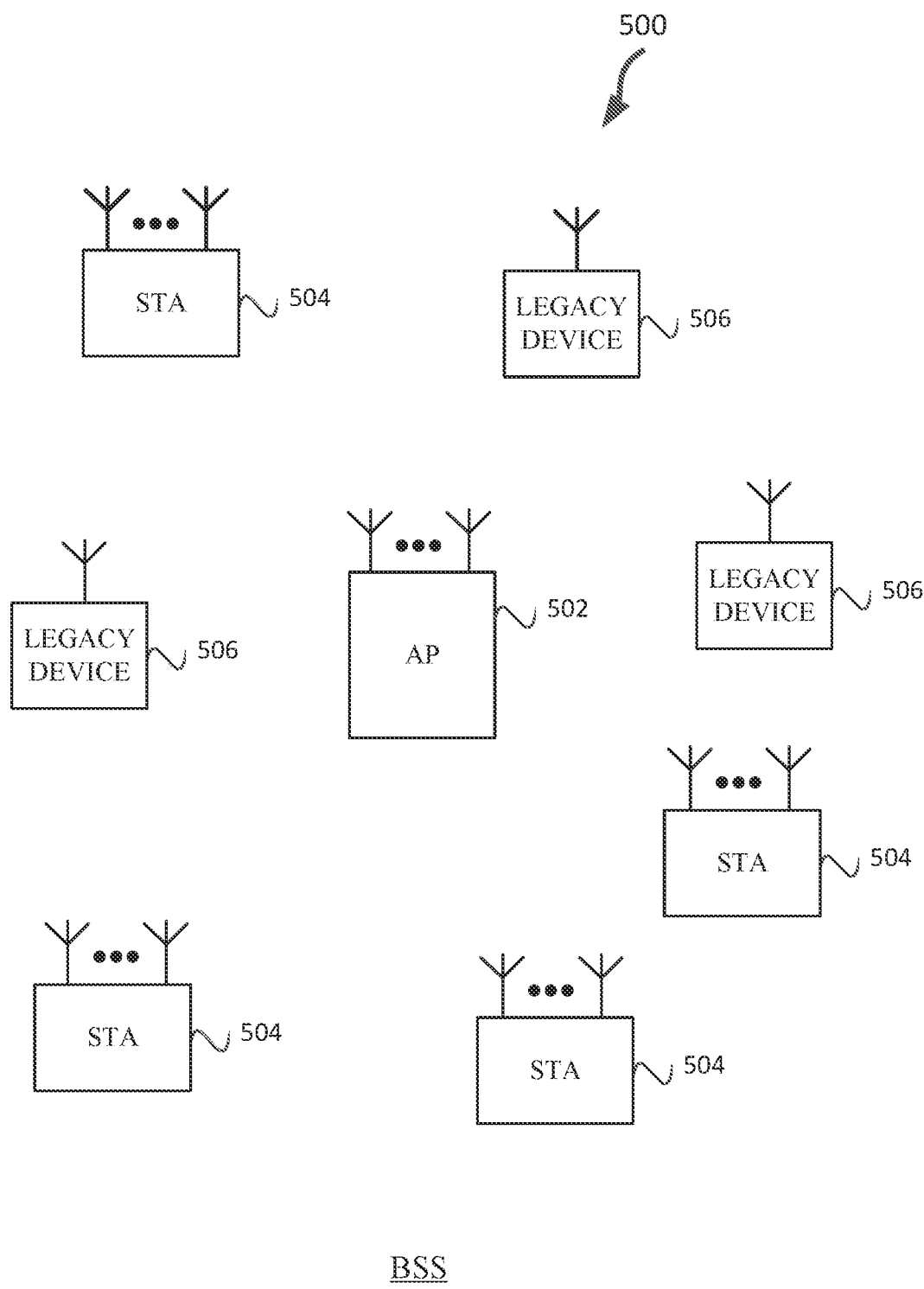
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT). In some embodiments, the STAs 504 and/or AP 520 are configured to operate in accordance with IEEE 802.11az. In some embodiments, IEEE 802.11EHT may be termed Next Generation 802.11.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11 be or another wireless protocol.

The AP 502 may communicate with legacy devices 506 in accordance with legacy IEEE 802.11 communication techniques. In example embodiments, the AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11 EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 504 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the STA 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-16.

In example embodiments, the STAs 504 and/or the AP 502 are configured to perform the methods and operations/functions described herein in conjunction with FIGS. 1-16. In example embodiments, an apparatus of the STA 504 and/or an apparatus of the AP 502 are configured to perform the methods and functions described herein in conjunction with FIGS. 1-16. The term Wi-Fi may refer to one or more of the IEEE 802.11 communication standards. AP and STA may refer to EHT access point and/or EHT station as well as legacy devices 506.

In some embodiments, a STA 504 is an EHT STA. In some embodiments, an AP 502 is a EHT AP. In some embodiments, a HE STA or HE AP is a legacy device 506. In some embodiments, when a STA 504 is not operating as an AP, it may be referred to as a non-AP STA or non-AP. In some embodiments, STA 504 may be referred to as either an AP STA or a non-AP.

In some embodiments, a physical layer protocol data unit (PPDU) may be a physical layer conformance procedure (PLCP) protocol data unit (PPDU). In some embodiments, the AP 502 and STAs 504 may communicate in accordance with one of the IEEE 802.11 standards. IEEE P802.1 be™/D1.1, June 2021, IEEE P802.11-REVmd™/D3.4, March 2020, and IEEE P802.1 1ax are incorporated herein by reference.

Figure 6:
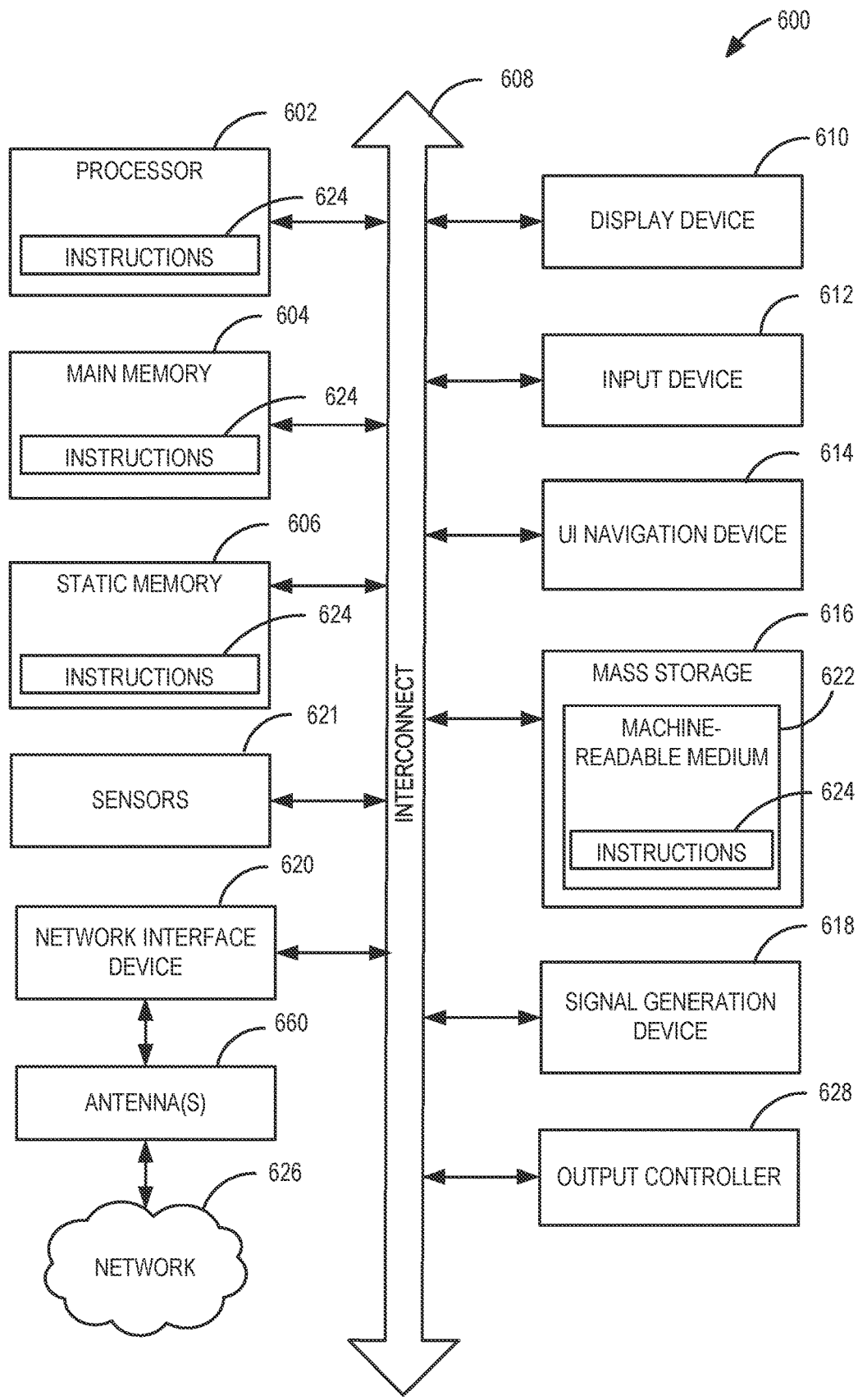
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as Wi Max®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
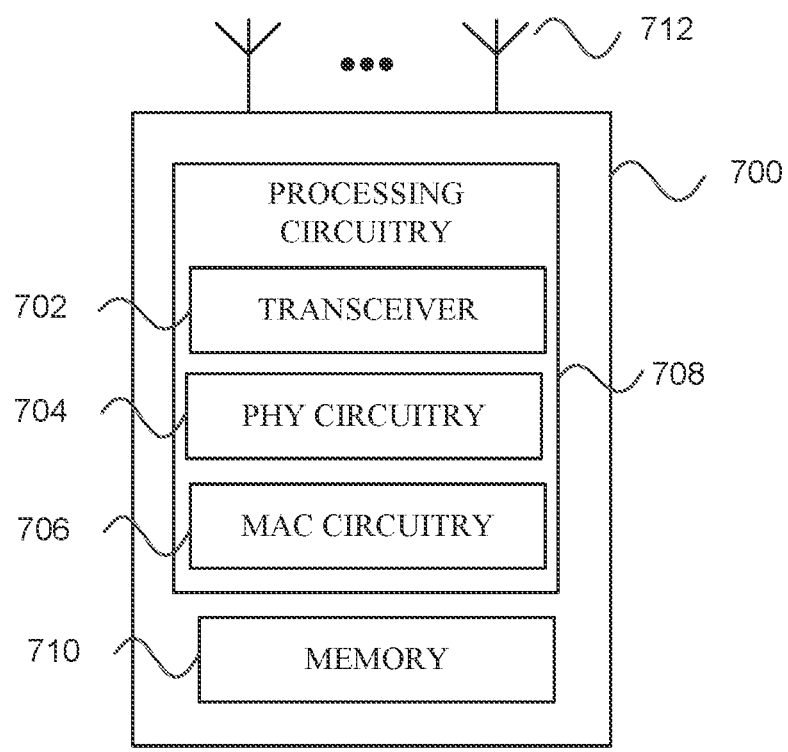
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem is how to define the channel operation on the 6 GHz band for the IEEE 802.11EHT. In some embodiments, the technical is addressed by not permitting 80+80 PPDUs (or channels) or 160+160 MHz PPDUs (or channels) for EHT PPDUs because noncontiguous PPDUs transmission (PHY aggregation) is very similar to what multi-link provides with MAC aggregation, and the multi-link may be a more efficient use of the spectrum. Further multi-link transmission can provide multiple channel access, which provides a better gain for PHY aggregation. Additionally, the problem is addressed with different ways of signaling the center frequencies of the bandwidth used in EHT and by coordinating the bandwidth in EHT with the bandwidth used in legacy (non-EHT) BSSes such as only permitting operating bandwidths of non-EHT BSSes to be within the operating bandwidth of EHTs and to be contiguous.

Figure 8:
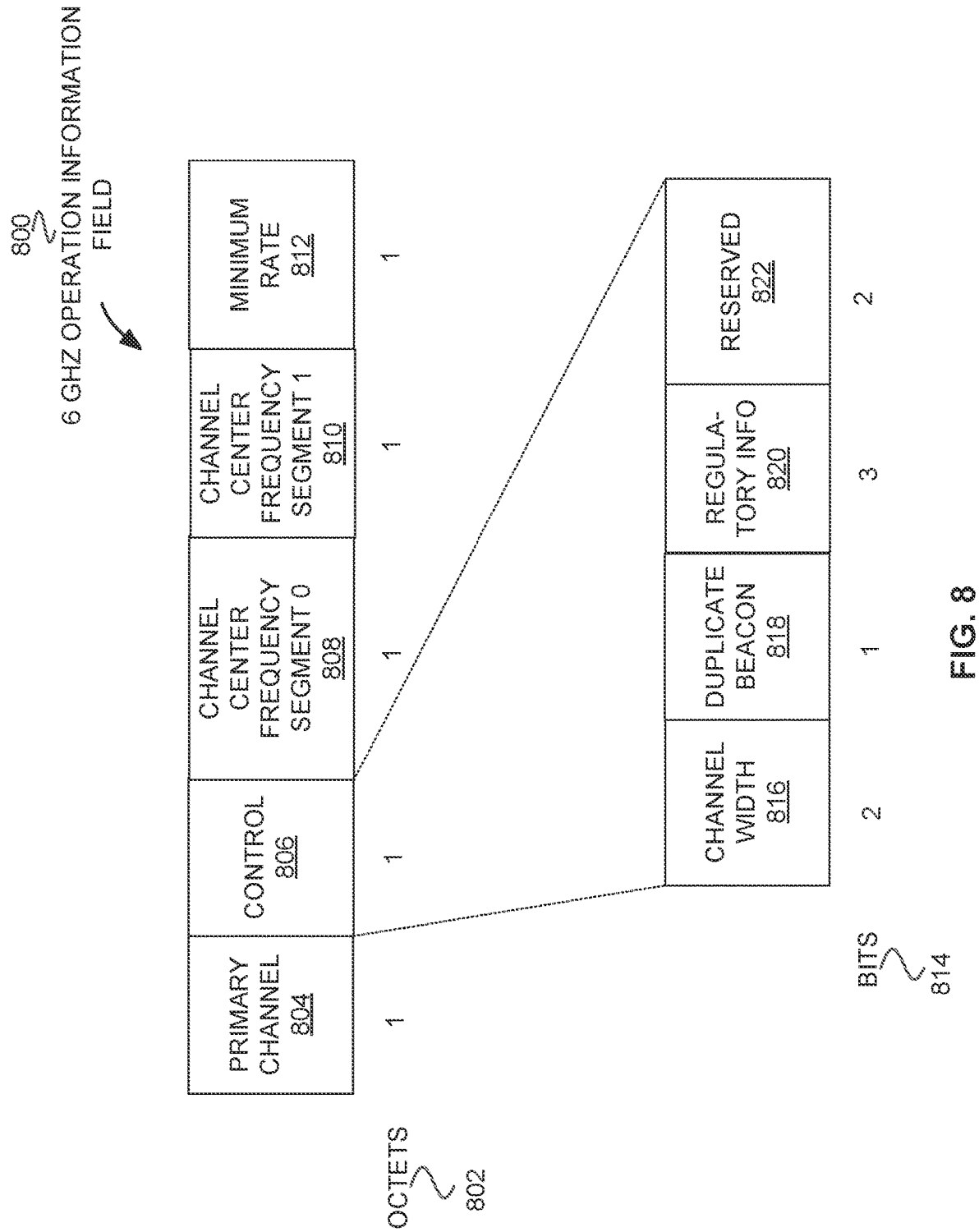
FIG. 8 illustrates a 6 GHz operation information field, in accordance with some embodiments.

FIG. 8 illustrates a 6 GHz operation information field 800, in accordance with some embodiments. FIG. 8 illustrates octets 802, primary channel 804 field, control 806 field, channel center frequency segment 0 808 field, channel center frequency segment 1 810 field, and minimum rate 812 field. The control 806 field includes a channel width 816 field, a duplicate beacon 818 subfield, a regulatory information 820 subfield, and a reserved 822 subfield. Bits 814 indicates the number of bits in the fields and subfields, in accordance with some embodiments. The 6 GHz operation information field 800 indicates channel and bandwidth information for 6 GHz operation. The primary channel 804 field indicates a channel number of the primary channel. The duplicate beacon 818 field indicates a beacon frame format. The regulatory information 808 subfield indicates information related to regulatory rules specific to the country of the BSS.

The channel center frequency segment 0 808 field indicates the channel center frequency index for 20 MHz, 40 MHz, 80 MHz, 80+80 MHz channel on which the BSS operates. If the BSS channel width is 80+80 MHz or 160 MHz, then the Channel Center Frequency Segment 0 808 field indicates the channel center frequency index of the primary 80 MHz. The Channel Center Frequency Segment 1 810 field indicates the channel center frequency index of the 160 MHz channel on which the BSS operates in the 6 GHz band. If the channel width is 80+80 MHz then the Channel Center Frequency Segment 1 field indicates the channel center frequency index of the secondary 80 MHz. The minimum rate 810 field indicates the minimum rate, that non-AP STAs, e.g., STAs 504, are allowed to use for sending PPDUs. The 6 GHz operation information field 800 is associated with a version of a communication standard such as IEEE 802.11 ax or another communication standard.

Figure 9:
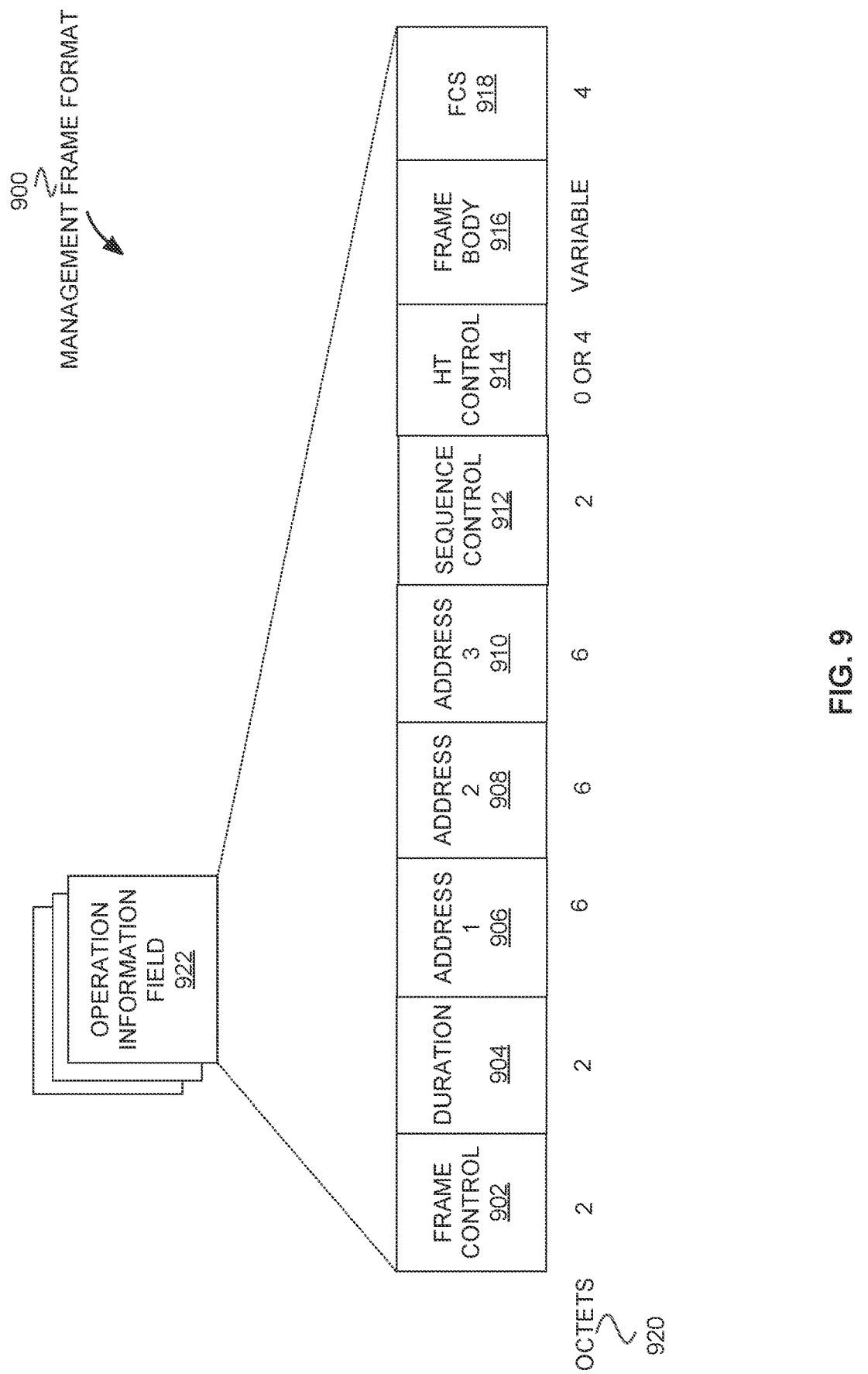
FIG. 9 illustrates a management frame, in accordance with some embodiments.

FIG. 9 illustrates a management frame 900, in accordance with some embodiments. Illustrated in FIG. 9 is frame control 902 field, duration 904 field, address 1 906 field, address 2 908 field, address 3 910 field, sequence control 912 field, HT control 914 field, frame body 916 field, FCS 918 field, octets 920, and operation information field 922. The frame body 916 includes a beacon frame, in accordance with some embodiments. The frame body 916 includes one or more operation information fields 922 such as 6 GHz operation information field 800 or EHT operation element 900, in accordance with some embodiments.

Figure 10:
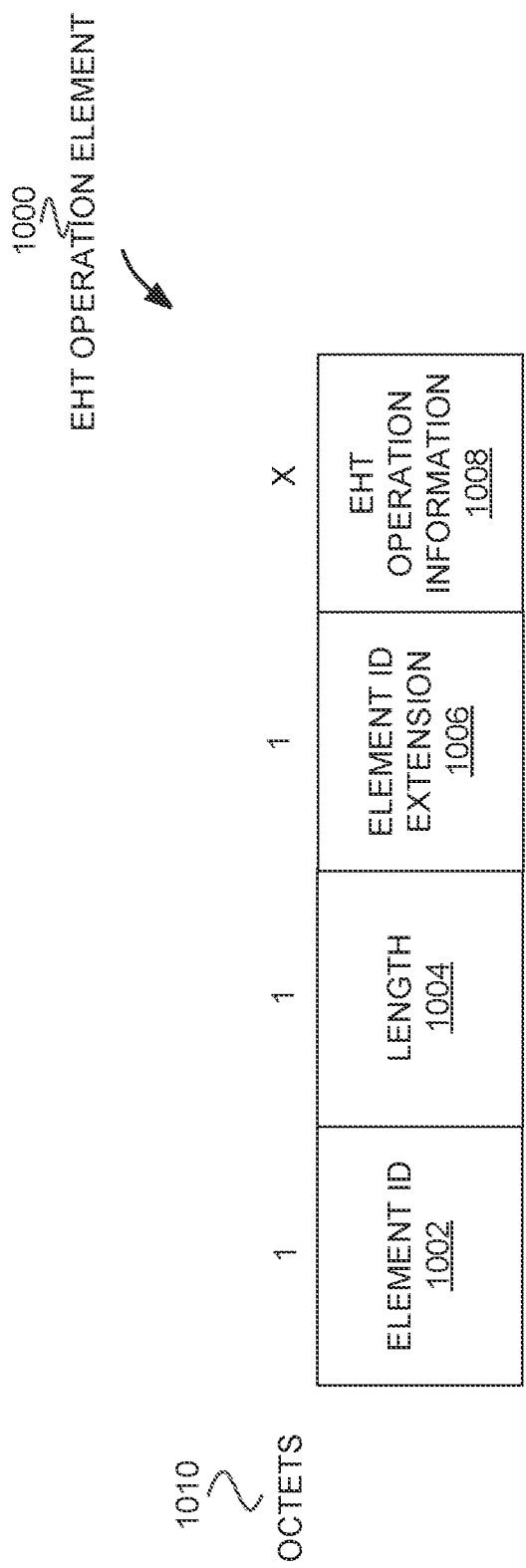
FIG. 10 illustrates an EHT operation element, in accordance with some embodiments.

FIG. 10 illustrates an EHT operation element 1000, in accordance with some embodiments. The EHT operation element 1000 includes an element identification (ID) 1002 field, length 1004 field, element ID extension 1006 field, and EHT operation information 1008 field. The element ID 1002 indicates an element ID. The length 1004 field indicates a length of the EHT operation element 1000. The element ID extension 1006 field combined with the element ID 1002 identifies the EHT operation element 1000. The octets 1010 indicate a number of octets of the fields. The EHT operation information 1008 field indicates X octets to indicate that the number of octets may be variable or the number of octets may be a fixed number such as a number from 1 to 10.

Figure 11:
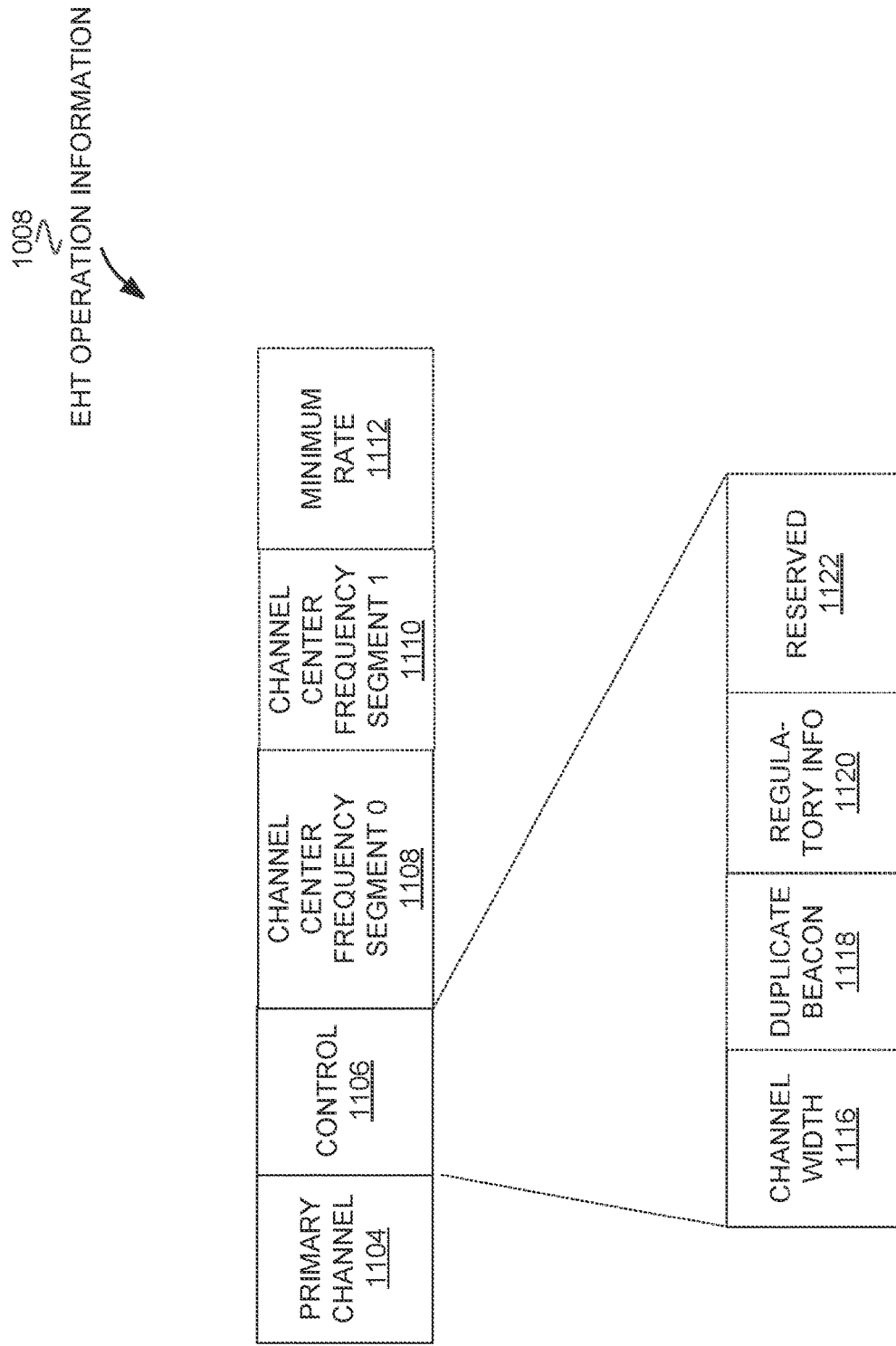
FIG. 11 illustrates an EHT operation information field, in accordance with some embodiments.

FIG. 11 illustrates an EHT operation information 1008 field, in accordance with some embodiments. The EHT operation information 1008 field includes a primary channel 1104 field, a control 1106 field, a channel center frequency segment 0 1108 field, channel center frequency segment 1 1110 field, and a minimum rate 1112 field. One or more of the fields is optional. The EHT STA obtains the channel configuration information from the EHT operation information element 1000 if operating in the 6 GHz band. Additionally, in some embodiments, the AP 502 and STA 504 are configured to combine the information from one or more operation information fields. For example, an AP 502 and STA 504 may use the minimum rate indicate in the minimum rate 812 field for the minimum rate for EHT operation in the 6 GHz band.

In some embodiments there is only one channel center frequency segment field, which may be termed a channel center frequency. The control 1106 field includes a channel width 1116 field, a duplicate beacon 1118 field, a regulatory information (info) 1120 field, and a reserved 1122 field. The channel width 1116 indicates a width of the 6 GHz channel to be used. The duplicate beacon 1118 field, the regulatory information (info) 1120 field, and the reserved 1122 field may be the same or similar as disclosed in conjunction with FIG. 8.

In some embodiments the channel width 1116 field indicates only a contiguous band of the 6 GHz band. The channel width 1116 field indicates the EHT BSS bandwidth. In some embodiments the channel width 1116 field is defined as disclosed in Table 1.

TABLE 1

| Channel Bandwidth | |
|---|---|
| Bit value | EHT BSS Bandwidth |
| 0 | 20 |
| 1 | 40 |
| 2 | 80 |
| 3 | 160 |
| 4 | 320 |
| Reserved | 240, 640, and other values |

In some embodiments, 80+80 and 160+160 BSS configurations are not permitted for EHT BSS in 6 GHz or 2.4/5 GHz. In some embodiments IEEE 802.11 be BSS configurations are without noncontiguous segments. The Federal Communication Commission (FCC) indicates that usage of 6 GHz band that under a standard power automated frequency controller (AFC), certain 20 MHz maybe restricted for usage after checking the database.

Table 2 indicates how the value indicated by channel center frequency segment (CCFS) 0 1108 field and channel center frequency segment 1 1110 field may be set based on the value indicated by the channel width 1116 field where column EHT CCFS is the case where there is only one CCFS.

TABLE 2

| Channel Width | EHT CCFS0 | EHT CCFS1 | EHT CCFS (only one CCFS) |
|---|---|---|---|
| 20 | Center of 20 | 0 | 0 |
| 40 | Center of 40 | 0 | 0 |
| 80 | Center of 80 | 0 | 0 |
| 160/80 + 80 | Center of primary 80 | Center of 160 or secondary 80 | 0 |
| 240/160 + 80/80 + 160 | Center of primary 80 | Center of primary 160 (240/160 + 80) Center of secondary 80 (80 + 160) | Center of third 80 MHz (240/160 + 80) Option 1: Center of secondary 80 and third 80 MHz (80 + 160) Option 2: Center of third 80 MHz (80 + 160) |
| 320/160 + 160 | Center of primary 80 | Center of primary 160 | Center of 320 or secondary 160 |

In some embodiments, the channel width indicated in the channel width 816 field for legacy BSSs (non-EHT) is different than channel width indicated by the channel width 1116 field for EHT BSSs. In an EHT BSS only a contiguous segment is indicated, in accordance with some embodiments.

Table 3 indicates the value indicated by the CCFS when there is only one CCFS rather than the two CCFS segment 0 1108 field and CCFS segment 1 1110 field, in accordance with some embodiments.

TABLE 3

| Channel Width | EHT CCFS | Determined by EHT STA and/or EHT AP |
|---|---|---|
| 20 | Center of 20 MHz | |
| 40 | Center of 40 MHz | |
| 80 | Center of 80 MHz | |
| 160 | Center of 160 MHz | Center of primary 80 MHz |
| 320 | Center of 320 MHz | Center of primary 80 MHz Center of primary 160 MHz |

Table 4 indicates the values indicated CCFS segment 0 1108 field and CCFS segment 1 1110 field when there are two CCFSs, in accordance with some embodiments.

TABLE 4

| Channel Width | EHT CCFS 0 | EHT CCFS 1 | Determined by EHT STA and/or EHT AP |
|---|---|---|---|
| 20 | Center of 20 MHz | 0 | |
| 40 | Center of 40 MHz | 0 | |
| 80 | Center of 80 MHz | 0 | |
| 160 | Center of 80 MHz | Center of 160 MHz | |
| 320 | Center of 160 MHz | Center of 320 MHz | Primary 80 MHz |

In some embodiments, Table 4 is used for the indication of the HE operation element in 6 GHz band up to a bandwidth of 160 MHz, so the implementation up to a bandwidth of 160 MHz can be the same for both EHT and HE operation elements for determining the values of EHT CCFS 1, EHT CCFS 2, HE CCFS 1, and HE CCFS 2.

An EHT STA, e.g., STA 504, that supports only a 160 MHz bandwidth EHT BSS is configured to decode an indication of 320 MHz properly set corresponding CCFS or CCFSs, in accordance with some embodiments. An EHT STA that supports only 80 MHz bandwidth EHT BSS is configured to decode an indication of 160 MHz and 320 MHz and properly set a corresponding CCFS or CCFSs, in accordance with some embodiments.

In some embodiments, the indicated EHT BSS configuration covers the BSS configuration indicated by HE operation element in 2.4/5/6 GHz band where the 2.4/5 bands are ignored because all that is needed is an indication that the 2.4/5 bands are noncontiguous. In some embodiments, the bandwidth indicated by channel width 816 is contiguous when there is also an EHT operation element 1000. This excludes configurations such as 80+80 MHz (channel bandwidth 816 field) to legacy STAs and 320 MHz (channel width 1116 field) to EHT STAs.

In 2.4 or 5 GHz band, if the EHT BSS (channel bandwidth 1116 field) indicates 320 MHz, then the legacy indication (channel bandwidth 816 field) is 160 MHz where 2.4/5 bands are ignored because all that is needed is a noncontiguous indication. In 6 GHz, legacy BSS indication (bandwidth 816 field) is may be smaller than EHT BSS (channel bandwidth 1116 field) independent of the BSS operating bandwidth indicated for EHT BSS, in accordance with some embodiments.

In 2.4/5 GHz, if EHT BSS indicates 320 MHz (channel bandwidth 1116 field), then the legacy BSS indicates 160 MHz, 80 MHz, 40 MHz, or 20 MHz (channel bandwidth 816 field). In 2.4/5 GHz, if the EHT operation information 1008 indicates an operating bandwidth (channel bandwidth 1116 field) less than 320 MHz, then the legacy BSS indicates the same BSS operating bandwidth. The 2.4/5 GHz bands use the channel bandwidth 1116 field indication (or separate indication in different operating fields) so that the EHT STA can access just one indication across the bands.

Figure 12:
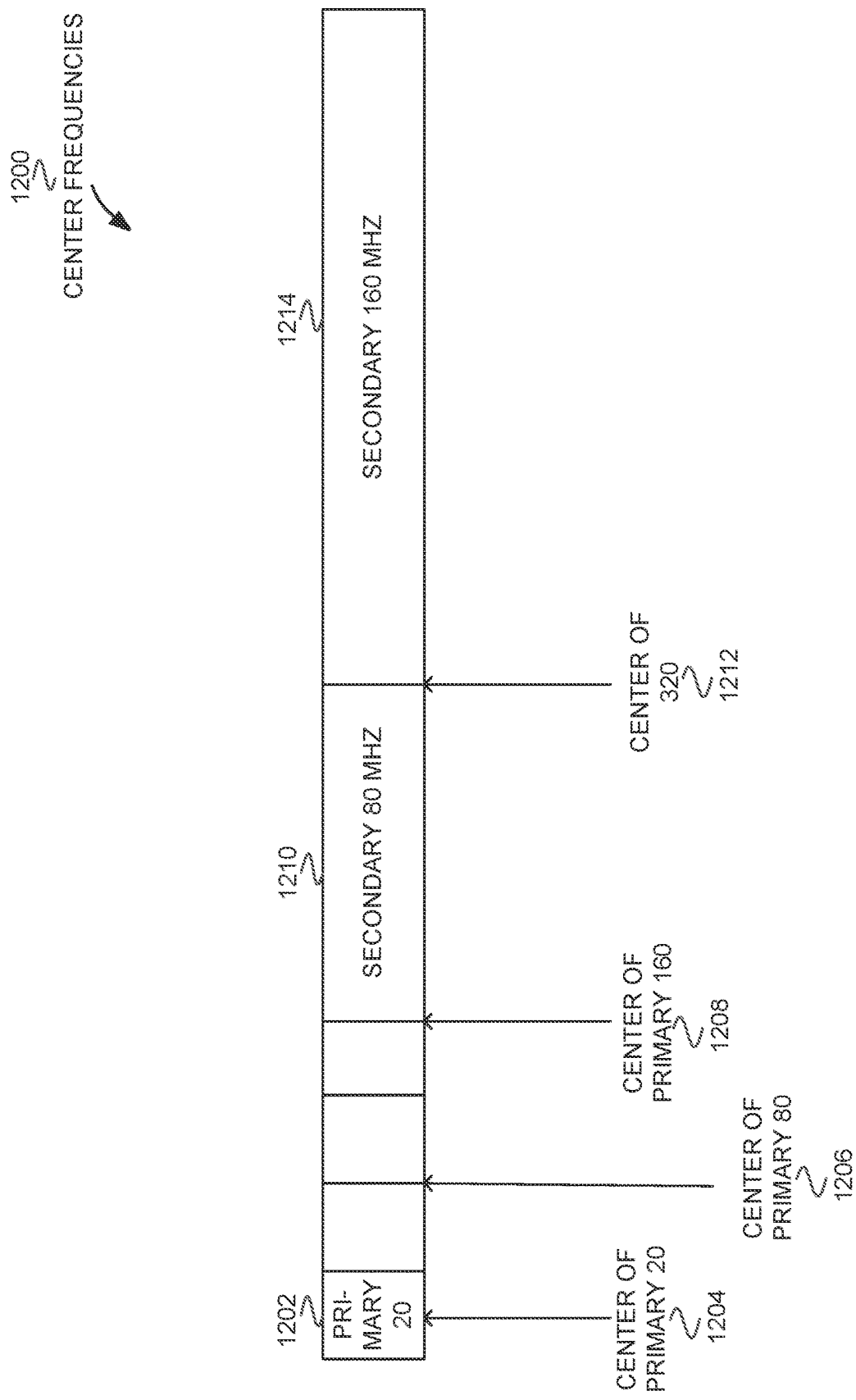
FIG. 12 illustrates the center frequencies for an operating bandwidth of 320 MHz, in accordance with some embodiments.

FIG. 12 illustrates the center frequencies 1200 for an operating bandwidth of 320 MHz, in accordance with some embodiments. The primary 20 MHz channel 1202 and the primary 80 MHz channel may be located in a different place. The channel center frequency segment 0 1108 field and channel center frequency segment 1 1110 field (or channel center frequency segment when there is only one CCFS) may be set to indicate values as disclosed in Table 2, 3, and 4 and herein.

For example, if there is only one CCFS, then according to Table 2 it is set to the center of 320 1212 or center of secondary 160 MHz 1214 (Table 2) or only the center of 320 1212 (Table 3). If there are two CCFSs, then channel center frequency segment 0 1108 field and channel center frequency segment 1 1110 field are set to center of primary 80 1206 and center of primary 160 1208 (Table 2), or center of primary 160 1208 and center of 320 1212 (Table 4). The center of primary 20 1204 may be determined by the EHT STA. Secondary 80 MHz 1210 and secondary 160 MHz 1214 are illustrated in FIG. 12.

Figure 13:
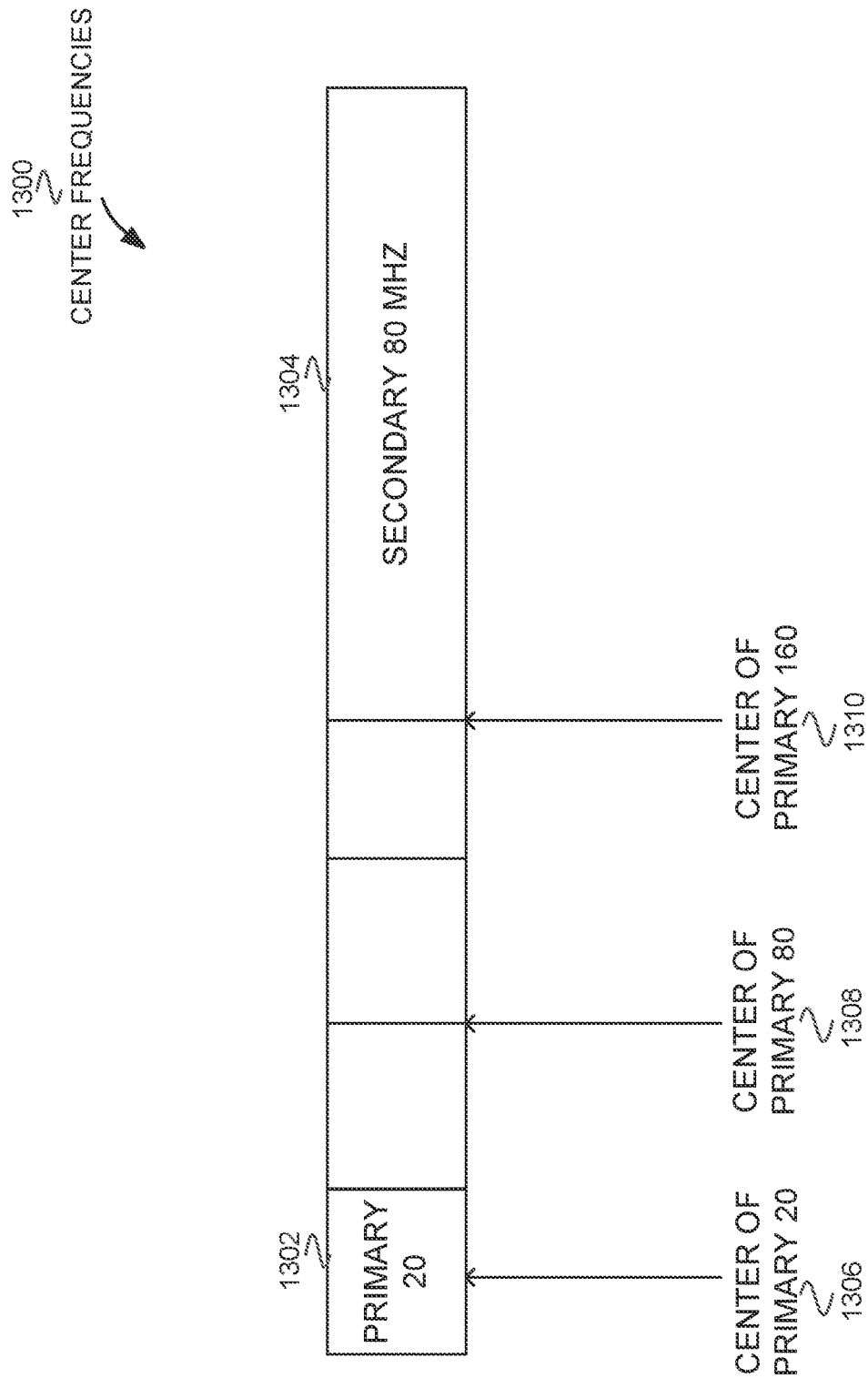
FIG. 13 illustrates the center frequencies for an operating bandwidth of 160 MHz, in accordance with some embodiments.

FIG. 13 illustrates the center frequencies 1300 for an operating bandwidth of 160 MHz, in accordance with some embodiments. The primary 20 1302, secondary 80 MHz 1304, center of primary 20 1306, center of primary 80 1308, and center of primary 160 1310 are illustrated. The channel bandwidth 816 is 160 MHz. The channel center frequency segment 0 1108 field and channel center frequency segment 1 1110 field (or channel center frequency segment when there is only one CCFS) may be set to indicate values as disclosed in Table 2, 3, and 4, and as disclosed herein. The EHT STA may determine centers as disclosed in Table 2, 3, and 4, and as disclosed herein.

Figure 14:
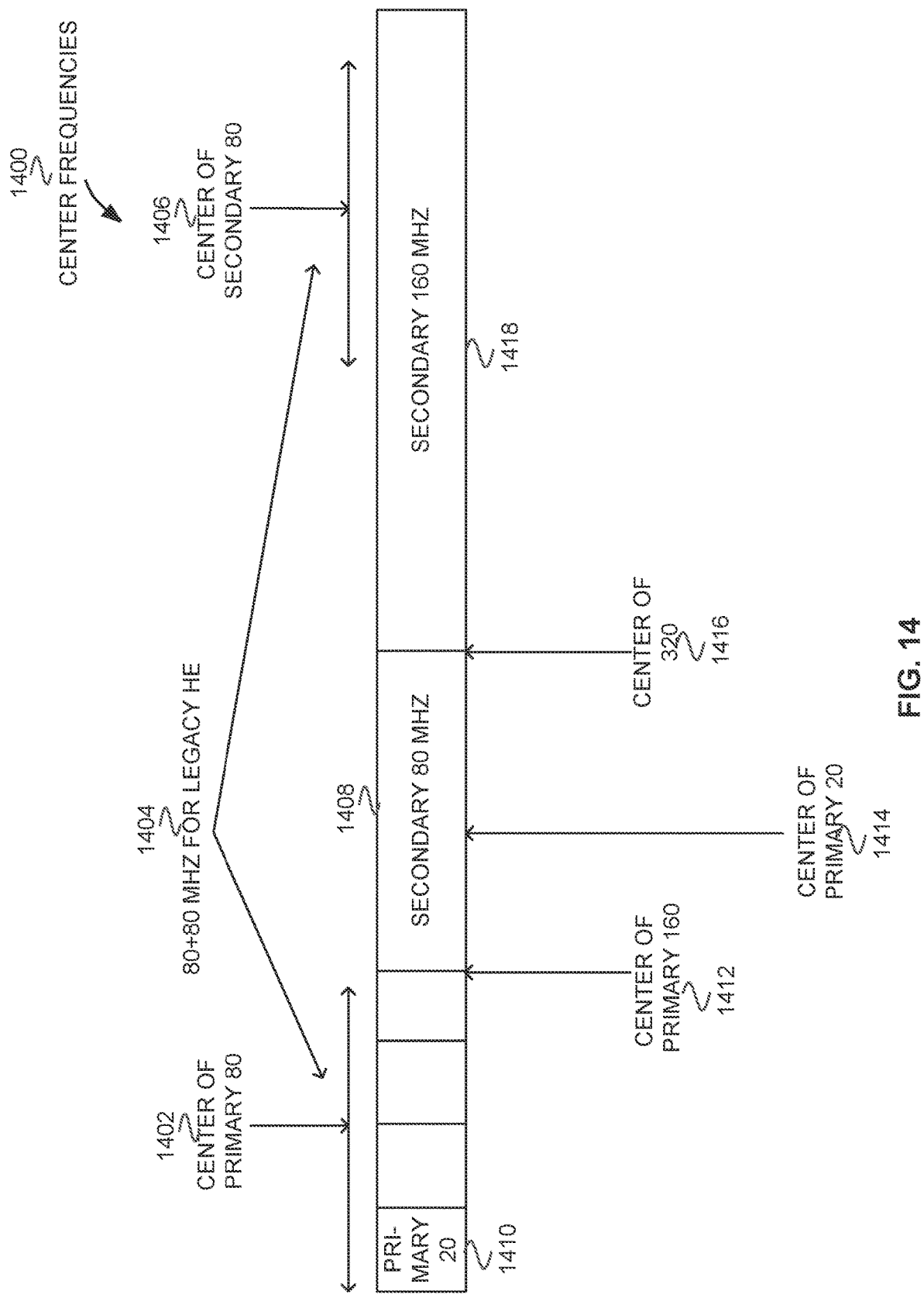
FIG. 14 illustrates the center frequencies for an operating bandwidth of 320 MHz and 80+80 MHz, in accordance with some embodiments.

FIG. 14 illustrates the center frequencies 1400 for an operating bandwidth of 320 MHz and 80+80 MHz, in accordance with some embodiments. Illustrated in FIG. 14 is center of primary 80 1402 (for legacy HE), 80+80 MHz for legacy HE 1404, center of secondary 80 1406 (for legacy HE), secondary 80 MHz 1408, primary 20 1410, center of primary 160 1412, center of primary 20 1414, center of 320 1416, and secondary 160 MHz 1418. The channel center frequency segment 0 1108 field and channel center frequency segment 1 1110 field (or channel center frequency segment when there is only one CCFS) may be set to indicate values as disclosed in Table 2, 3, and 4, and as disclosed herein for both the legacy HE and EHT. The EHT STA may determine centers as disclosed in Table 2, 3, and 4, and as disclosed herein.

The method 1900 may be performed by an apparatus of a QoS STA, STA, non-AP of a non-AP MLD or an apparatus of a non-AP MLD. Method 1900 may be performed by an MLD or a combination of a non-AP or AP affiliated with the MLD. The method 1900 may include one or more additional instructions. The method 1900 may be performed in a different order. One or more of the operations of method 1900 may be optional.

Figure 15:
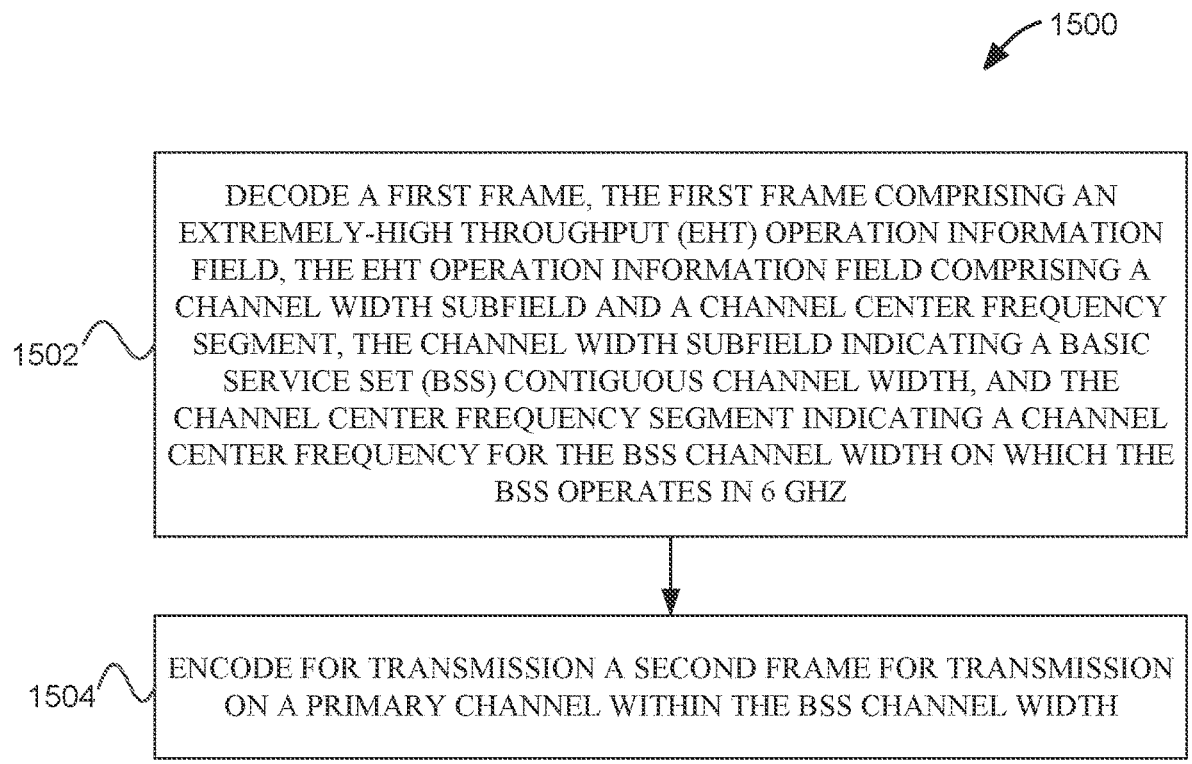
FIG. 15 illustrates a method for basic service set (BSS) channel operation, in accordance with some embodiments.

FIG. 15 illustrates a method 1500 for basic service set (BSS) channel operation, in accordance with some embodiments. The method 1500 begins at operation 1502 with decoding a first frame, the first frame comprising an EHT operation information field, the EHT operation information field comprising a channel width subfield and a channel center frequency segment, the channel width subfield indicating a BSS contiguous channel width, and the channel center frequency segment indicating a channel center frequency for the BSS channel width on which the BSS operates in 6 GHz. For example, a non-AP EHT STA, e.g., STA 504, may decode EHT operation element 1000, which may be included in a management frame 900 such as in an operation information field 922, where the EHT operation element 1000 includes EHT operation information 1008 that includes channel width 1116 and one or more CCFSs such as CCFS 0 1108 and CCFS 1 1110.

The method 1500 continues, operationally, at operation 1504 with encoding for transmission a second frame for transmission on a primary channel within the BSS channel width. For example, the non-AP EHT STA, e.g., STA 504, may encode a PPDU as disclosed herein in accordance with the EHT operation information 1008.

The method 1500 may include one or more additional operations. One or more operations of the method 1500 may be optional. The method 1500 may be performed by an apparatus of an AP 502, an AP 502, an apparatus of a STA 504, or a STA 504.

Figure 16:
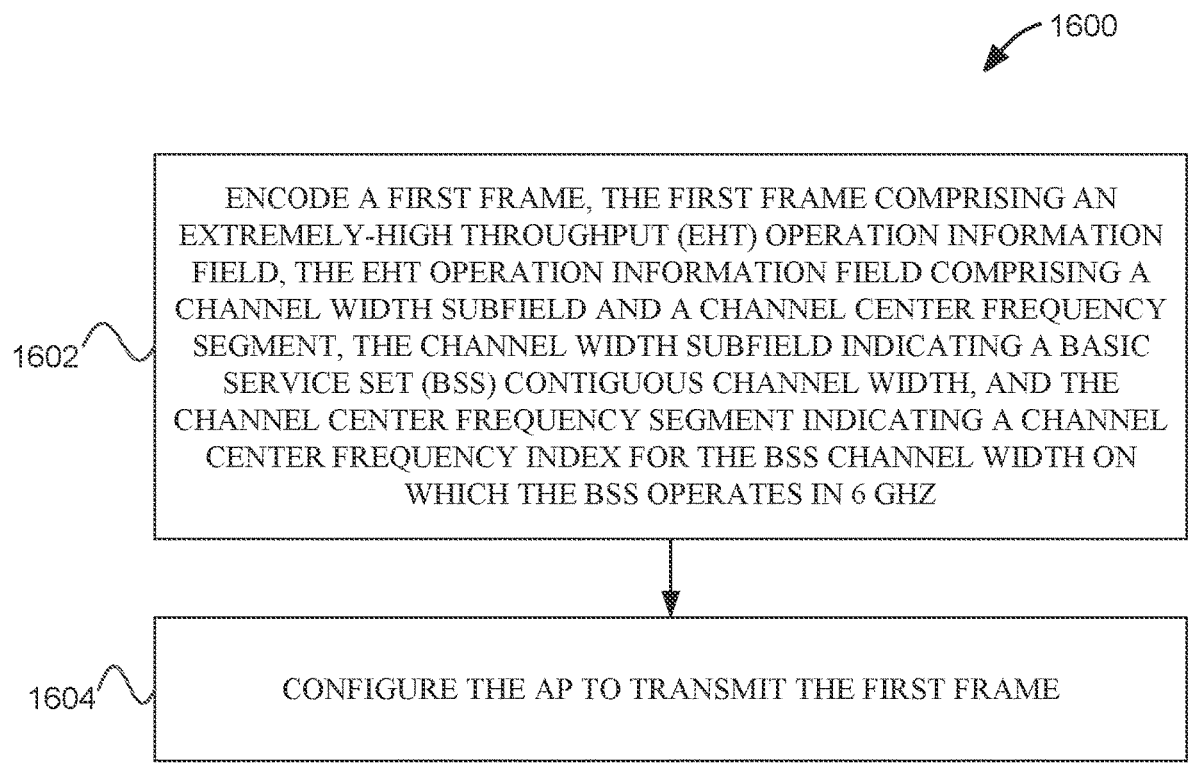
FIG. 16 illustrates a method for basic service set (BSS) channel operation, in accordance with some embodiments.

FIG. 16 illustrates a method 1600 for basic service set (BSS) channel operation, in accordance with some embodiments. The method 1600 begins at operation 1602 with encoding a first frame, the first frame comprising an EHT operation information field, the EHT operation information field comprising a channel width subfield and a channel center frequency segment, the channel width subfield indicating a BSS contiguous channel width, and the channel center frequency segment indicating a channel center frequency index for the BSS channel width on which the BSS operates in 6 GHz. For example, an EHT AP 502 may encode EHT operation element 1000, which may be included in a management frame 900 such as in an operation information field 922, where the EHT operation element 1000 includes EHT operation information 1008 that includes channel width 1116 and one or more CCFSs such as CCFS 0 1108 and CCFS 1 1110.

The method 1600 continues at operation 1604 with configuring the AP to transmit the first frame. For example, an apparatus of an AP 502 may configure the AP 502 to transmit the first frame, which may be a PPDU such as management frame 900.

The method 1600 may include one or more additional operations. One or more operations of the method 1600 may be optional. The method 1600 may be performed by an apparatus of an AP 502, an AP 502, an apparatus of a STA 504, or a STA 504.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an extremely-high throughput (EHT) station (STA), the apparatus comprising: memory; and, processing circuitry coupled to the memory, the processing circuitry configured to:
decode a first frame, the first frame comprising an extremely-high throughput (EHT) operation information field, the EHT operation information field comprising a channel width subfield, a channel center frequency segment 0 (CCFS0) subfield, and a CCFS1 subfield, the channel width subfield indicating an EHT basic service set (BSS) bandwidth, the CCFS0 subfield indicting a channel center frequency if the EHT BSS bandwidth is one of: 20, 40, and 80 MHz, and the CCFS1 subfield indicating the channel center frequency if the EHT BSS bandwidth is one of: 160 and 320 MHz, wherein the EHT STA is configured to operate in a 6 GHz band; and
encode for transmission a second frame within the BSS channel bandwidth indicated by the EHT operation information field.

2. The apparatus of claim 1, wherein the CCFS0 subfield further indicates a primary 80 MHz channel if the EHT BSS bandwidth is 160 MHz and indicates a primary 160 MHz channel if the EHT BSS bandwidth is 320 MHz.

3. The apparatus of claim 1, wherein the first frame further comprises a EHT operation element, the EHT operation element comprising an element identification (ID) field, a length field, an element ID extension field, and the EHT operation information field.

4. The apparatus of claim 1, wherein the channel width subfield is three bits.

5. The apparatus of claim 1, wherein the CCFS0 subfield indicates a channel center frequency index for the 20, 40, or 80 MHz channel on which the EHT BSS operates, or the CCFS1 subfield indicates the channel center frequency index for the 160 or 320 MHz channel on which the EHT BSS operates.

6. The apparatus of claim 1, wherein the CCFS0 subfield indicates a channel center frequency index of a primary 80 MHz channel if the EHT BSS bandwidth is 160 MHz and indicates the channel center frequency index of a primary 160 MHz channel if the EHT BSS bandwidth is 320 MHz.

7. The apparatus of claim 1, wherein the first frame further comprises a beacon frame, the beacon frame comprising an EHT operation element, the EHT operation element comprising an element identification (ID) field, a length field, an element ID extension field, and the EHT operation information field.

8. The apparatus of claim 1, wherein the first frame is a physical layer (PHY) protocol data unit (PPDU).

9. The apparatus of claim 1, wherein the EHT STA is configured to operation in accordance with Institute of Electrical and Electronic Engineering (IEEE) 802.11.

10. The apparatus of claim 1, wherein the EHT STA is an EHT non-access point (AP), and wherein the EHT STA is affiliated with a multi-link device (MLD).

11. The apparatus of claim 1, wherein the first frame is received from an EHT access point (AP).

12. The apparatus of claim 1, wherein the EHT operation information field comprises a control field, the control field comprising the channel width subfield and a reserved subfield.

13. The apparatus of claim 1, wherein the processing circuitry is further configured to:
determine or a primary 80 MHz channel if the EHT BSS bandwidth is 320 MHz.

14. A non-transitory computer-readable storage medium that stores instructions for execution by one or more processors of an apparatus for an extremely-high throughput (EHT) station (STA), the instructions to configure the one or more processors to:
decode a first frame, the first frame comprising an extremely-high throughput (EHT) operation information field, the EHT operation information field comprising a channel width subfield, a channel center frequency segment 0 (CCFS0) subfield, and a CCFS1 subfield, the channel width subfield indicating an EHT basic service set (BSS) bandwidth, the CCFS0 subfield indicting a channel center frequency if the EHT BSS bandwidth is one of: 20, 40, and 80 MHz, and the CCFS1 subfield indicating the channel center frequency if the EHT BSS bandwidth is one of: 160 and 320 MHz, wherein the EHT STA is configured to operate in a 6 GHz band; and
encode for transmission a second frame within the BSS channel bandwidth indicated by the EHT operation information field.

15. The non-transitory computer-readable storage medium of claim 14, wherein the CCFS0 subfield further indicates a primary 80 MHz channel if the EHT BSS bandwidth is 160 MHz and indicates a primary 160 MHz channel if the EHT BSS bandwidth is 320 MHz.

16. The non-transitory computer-readable storage medium of claim 14, wherein the first frame further comprises a EHT operation element, the EHT operation element comprising an element identification (ID) field, a length field, an element ID extension field, and the EHT operation information field.

17. The non-transitory computer-readable storage medium of claim 14, wherein the channel width subfield is three bits.

18. An apparatus for an extremely-high throughput (EHT) access point (AP), the apparatus comprising: memory; and, processing circuitry coupled to the memory, the processing circuitry configured to:
encode, for transmission to an EHT station, a first frame, the first frame comprising an extremely-high throughput (EHT) operation information field, the EHT operation information field comprising a channel width subfield, a channel center frequency segment 0 (CCFS0) subfield, and a CCFS1 subfield, the channel width subfield indicating an EHT basic service set (BSS) bandwidth, the CCFS0 subfield indicting a channel center frequency if the EHT BSS bandwidth is one of: 20, 40, and 80 MHz, and the CCFS1 subfield indicating the channel center frequency if the EHT BSS bandwidth is one of: 160 and 320 MHz, wherein the EHT AP is configured to operate in a 6 GHz band; and
decode for transmission a second frame within the BSS channel bandwidth indicated by the EHT operation information field.

19. The apparatus of claim 18, wherein the CCFS0 subfield further indicates a primary 80 MHz channel if the EHT BSS bandwidth is 160 MHz and indicates a primary 160 MHz channel if the EHT BSS bandwidth is 320 MHz.

20. The apparatus of claim 18, wherein the first frame further comprises a EHT operation element, the EHT operation element comprising an element identification (ID) field, a length field, an element ID extension field, and the EHT operation information field.

* * * * *